United States Patent [19]

Morita et al.

[11] Patent Number: 5,074,401
[45] Date of Patent: Dec. 24, 1991

[54] BOBBIN-CARRYING APPARATUS OF A COMBINED FINE SPINNING MACHINE AND WINDER

[75] Inventors: Takayuki Morita; Tatemi Fukuda, both of Kariya, Japan

[73] Assignee: Kabushiki Kaisha Toyoda Jidoshokki Seisakusho, Kariya, Japan

[21] Appl. No.: 365,012

[22] Filed: Jun. 12, 1989

[30] Foreign Application Priority Data

Jun. 16, 1988 [JP] Japan .............................. 63-79719[U]
Jun. 16, 1988 [JP] Japan ................................ 63-148624

[51] Int. Cl.⁵ ............................................. B65G 29/00
[52] U.S. Cl. .................... 198/465.1; 198/487.1; 198/803.01; 198/803.12
[58] Field of Search ........... 198/465.1, 803.01, 803.12, 198/487.1; 242/35.5 A

[56] References Cited

U.S. PATENT DOCUMENTS 4,781,287 11/1988 Fukushima ..................... 198/803.01
4,842,206 6/1989 Kawasaki et al. .............. 242/35.5 A

FOREIGN PATENT DOCUMENTS 0314089 5/1989 European Pat. Off. ......... 198/465.1

60-50665 4/1985 Japan .
62-180882 8/1987 Japan .
2180882 8/1987 Japan ............................. 242/35.5 A
2191304 8/1987 Japan ............................. 198/803.01

Primary Examiner—H. Grant Skaggs
Assistant Examiner—Cheryl L. Gastineau
Attorney, Agent, or Firm—Brooks Haldt Haffner & Delahunty

[57] ABSTRACT

A bobbin-carrying apparatus to carry peg trays which have a tray and a peg protruded on one surface of the tray to support bobbins between conveyors provided at a fine spinning machine and bobbin-carrying routes provided at a winder. The bobbin-carrying apparatus comprises belts provided between the conveyors and the bobbin-carrying routes, pulleys guiding and supporting the belts, motors driving the belts functionally connected with the belts, and a pair of linear guiding members extending along the belts having the pegs of the peg trays therebetween. The belts carry the peg trays pressing the trays cooporating with the guiding members. The guiding members are provided relative to the belts so that the peg trays are carried while the pegs are arranged in the horizontal posture between the fine spinning machine and the winder.

13 Claims, 10 Drawing Sheets

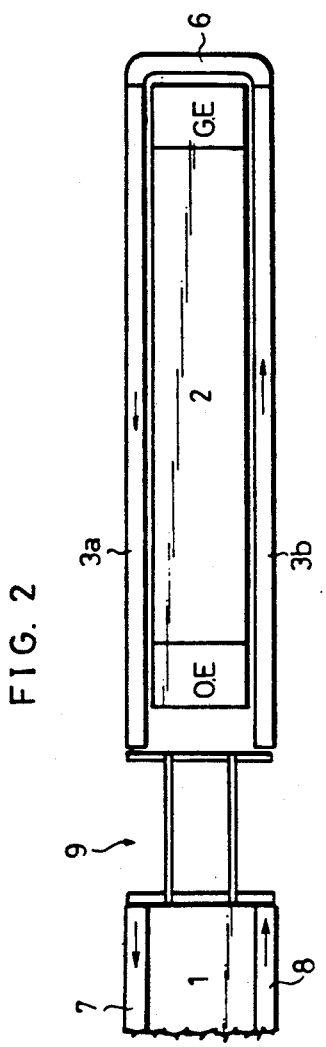
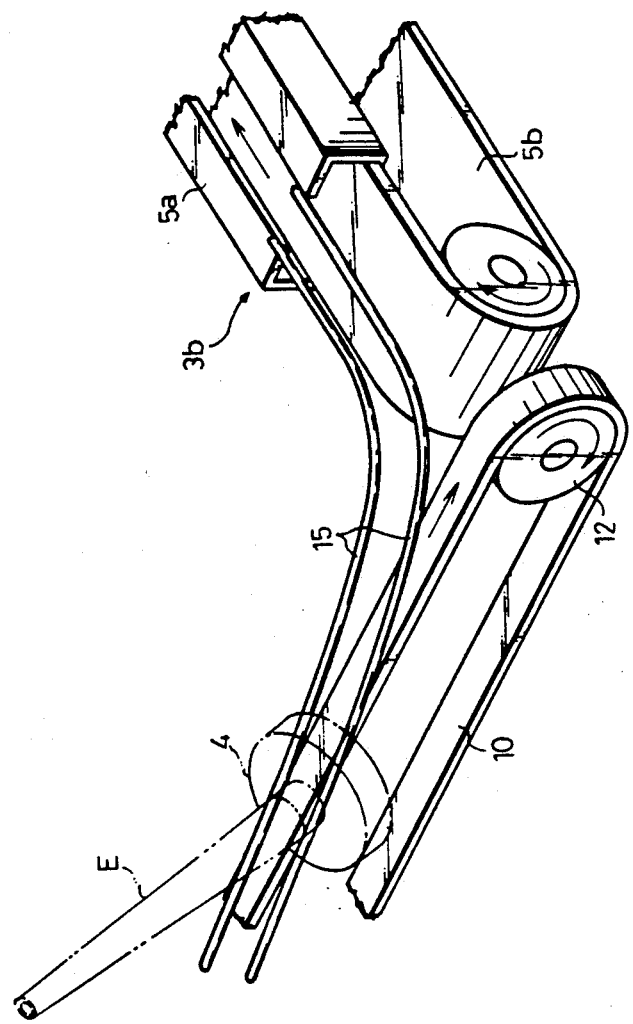
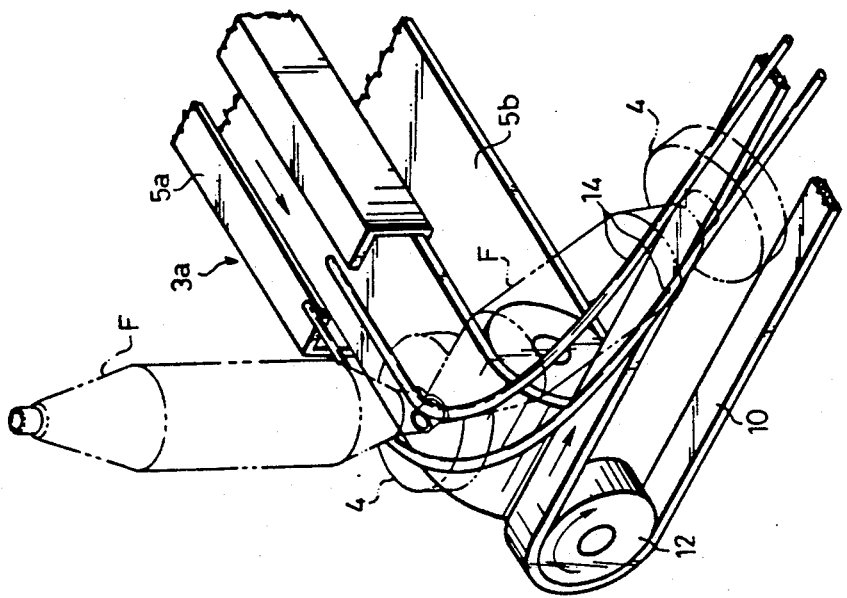
FIG. 2
FIG. 3a
FIG. 3b

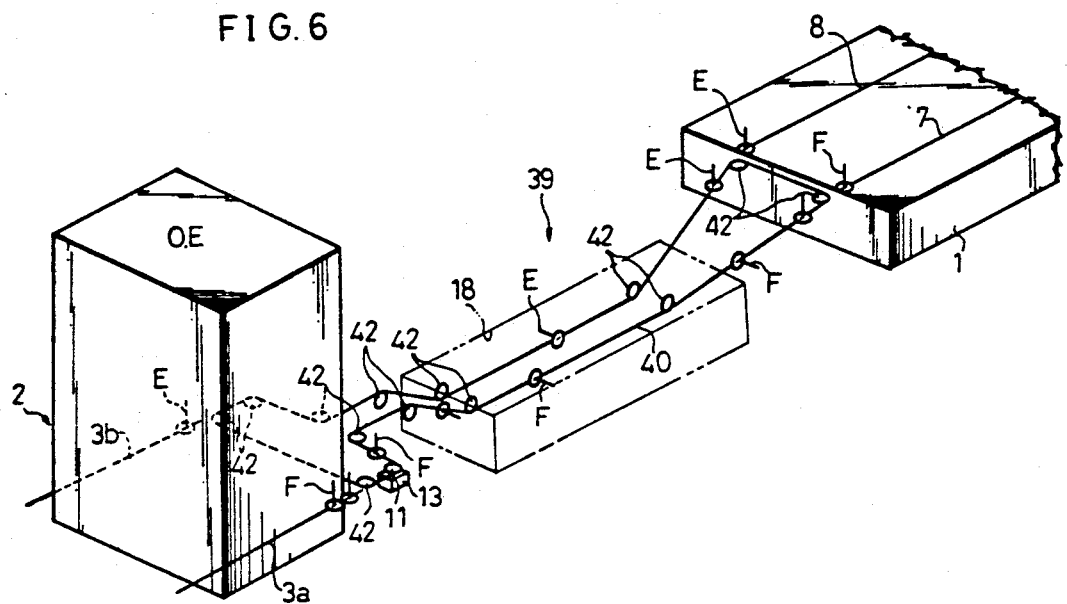
FIG. 6
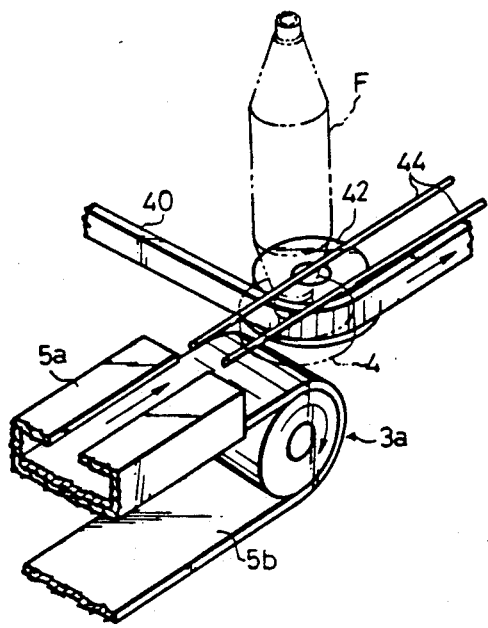
FIG. 7
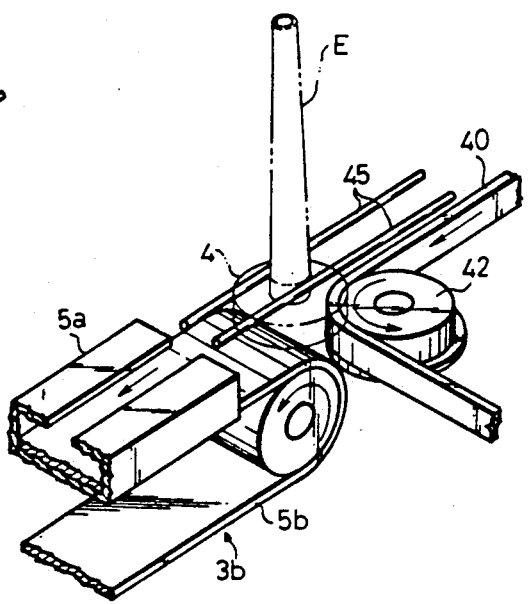
FIG. 8

BOBBIN-CARRYING APPARATUS OF A COMBINED FINE SPINNING MACHINE AND WINDER

FIELD OF THE INVENTION

The present invention is related to a bobbin-carrying apparatus which carries and supplies full bobbins and empty bobbins directly between a fine spinning machine and a winder utilizing peg trays with a peg protruded on the upper surface thereof.

DESCRIPTION OF THE RELATED ART

Generally, a yarn produced by a fine spinning machine especially by a ring spinning machine is wound by a winder on packages which have sizes and shapes appropriate to the next step. On purposes of energy saving and high productiveness are suggested different kinds of combined fine spinning machine and winders which directly connect a fine spinning machine and a winder with each other by a bobbin-carrying route and which carry and supply the yarn (on full bobbins) produced at the fine spinning machine to the winder and empty bobbins used at the winder to the fine spinning machine. As one kind of fine spinning machines of the type described above, in Japanese Laid-Open Utility Model Publication No. 60-50665 is disclosed a combined fine spinning machine and winder which connects a winder and a fine spinning machine with each other one by one and which carries full bobbins and empty bobbins on peg trays which have a peg protruded on the upper surface thereof.

In the combined fine spinning machine and winder described above, peg tray carriers are respectively provided between an exit of a carrying route arranged at the fine spinning machine and an entrance of a carrying route arranged at the winder and between an exit of the carrying route at the winder and an entrance of the carrying route at the fine spinning machine. A peg tray carrier can be or even actually is placed underground or at a ceiling so that it might not be in the way when an operator has to walk through the space between the fine spinning machine and the winder. When a vertical conveyor 101 is used in order to carry peg trays with bobbins upward or downward as shown in FIG. 18, there is a problem that an installation space of the conveyor must be large because a radius R of the curvature of the conveyor can not be small because of the interference, which will happen when the radius R of the curvatures is small, of full bobbins F or empty bobbins. In order to solve the problem above, in Japanese Laid-Open Patent Publication No. 62-180882 is disclosed a bobbin carrier in which an endless transmission belt is installed movable along a predetermined route via belt guides and guiding pulleys. Moreover, along the transmission belt are provided two lines of guides which slidingly contact on the upper surfaces of peg trays, and the peg trays are carried with the transmission belt while being elastically pressed between the transmission belt and the guides. In the bobbin carrier described above, the posture of empty bobbins E and full bobbins fitted to the peg trays can be freely changed when the guides 103 are provided at torsional positions to the transmission belt 104 as shown in FIG. 19.

In the aforementioned combined fine spinning machine and winder, there are problems; bobbins fitted to the peg trays are carried in the vertical posture at the portion where the conveyor runs horizontally, so that the height of a step provided, in order to make it possible for an operator to walk above the carrier, above the peg tray carrier positioned on the floor might be very large, or also so that the depth of an underground pit might be very large and it requires high construction cost when the peg tray carrier is positioned underground.

SUMMARY OF THE INVENTION

An object of the present invention is to provide a bobbin-carrying apparatus of a combined fine spinning machine and winder in which the installation cost will be lower and the space occupied by the bobbin-carrying apparatus can be smaller when the apparatus is provided on the places such as on the floor, underground, at the ceiling, and so on corresponding to the positions of a winder and a fine spinning machine frame in accordance with the demand of a factory.

Another object of the present invention is to provide a bobbin-carrying apparatus of a combined fine spinning machine and winder in which the occupying space for installing the carriers can be small and the passage of an operator will be easier on a lower step provided above the carriers when the carriers are positioned on the floor, and in which the installation cost of an underground pit will be lower having the depth of the underground pit shallower when the carriers are positioned underground.

In order to realize the objects above, a bobbin-carrying apparatus of the present invention comprises belt means provided between conveyors and bobbin-carrying routes, guiding means for guiding and supporting the belt means, driving means for driving the belt means operatively connected with the belt means, a pair of linear guiding members provided to the belt means extending along the belt means sandwiching pegs of peg trays therebetween, the belt means carrying the peg trays while elastically pressing the trays cooperating with the guiding members, and the guiding members provided relative to the belt means so that the peg trays are carried while the pegs are in the horizontal posture.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

FIGS. 1 to 5 show the first embodiment of the present invention,

FIG. 1 is a diagrammatic perspective view of a bobbin-carrying apparatus,

FIG. 2 is a diagrammatic plan view showing the relationship of the positions of a winder and a fine spinning machine frame, FIG. 3 (a) is a partial perspective view of a full bobbin transferring portion, FIG. 3 (b) is a partial perspective view of a empty bobbin transferring portion, FIG. 4 is a partial side view showing the supporting states of a guiding members and a belt, FIG. 5 (a) is an enlarged sectional view taken along the line A—A in FIG. 4, FIG. 5 (b) is a sectional view of a modified example of FIG. 5 (a), FIGS. 6 to 8 show the second embodiment of the present invention, FIG. 6 is a diagrammatic perspective view of a bobbin-carrying apparatus, FIG. 7 is a partial perspective view of a full bobbin transferring portion, FIG. 8 is a partial perspective view of an empty bobbin transferring portion, FIG. 11 is a diagrammatic perspective view of a bobbin-carrying apparatus, FIG. 12 is a diagrammatic plan view showing the relationship of the positions of the winder and the fine spinning machine frame, FIG. 13 (a) is a partial perspective view of a full bobbin transferring portion, FIG. 13 (b) is a side view of the same, FIG. 14 is a partial perspective view of an empty bobbin transferring portion.

DESCRIPTION OF THE PREFERRED EMBODIMENTS

The First Embodiment

Figure 1:
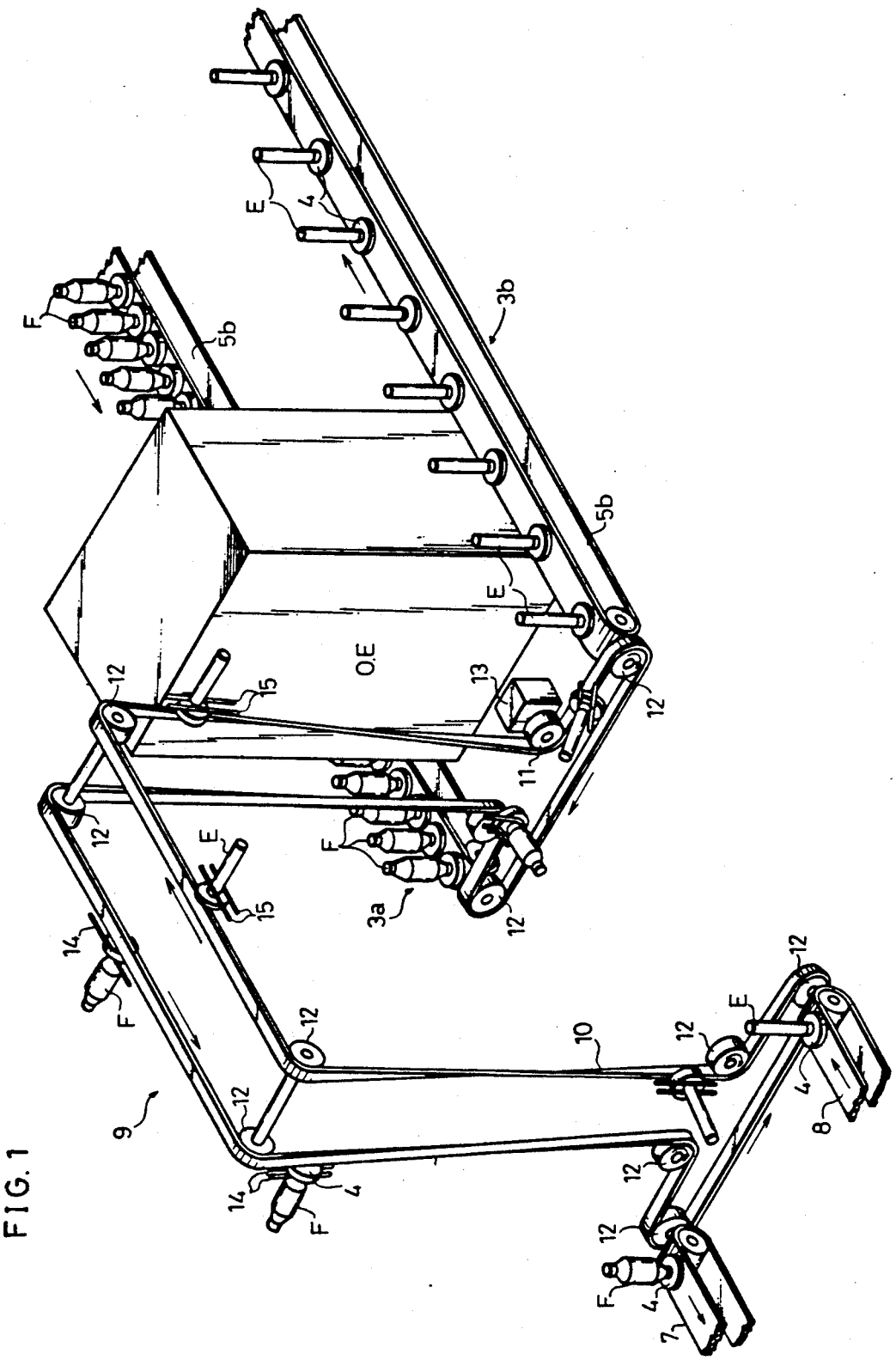

The first embodiment of the present invention will be explained hereinafter referring to FIGS. 1 to 5. As shown in FIG. 2, a fine spinning machine frame 2 is provided beside a winder 1 and is positioned in a straight line extending in the longitudinal direction of the winder 1. Conveyors 3a and 3b as tray-carrying routes are provided at each side of the fine spinning machine frame 2 in the width direction and extend along the length of the fine spinning machine frame 2. In order to carry empty bobbins E and full bobbins F by utilizing peg trays 4 with pegs 4a protruded on the upper surfaces of trays 4b, the conveyors 3a and 3b comprise guiding rails 5a (as shown in FIGS. 3 (a), and 3 (b)) to guide the peg trays 4, and belt conveyors 5b which carry the peg trays 4. The conveyors 3a and 3b are connected with each other by a connecting rail 6 at a gear end side G.E of the fine spinning machine frame 2, so that the peg trays 4 can be carried from the conveyor 3a to the conveyor 3b. A full bobbin-carrying route 7 and an empty bobbin-carrying route 8 are provided at the sides of the winder 1; the full bobbin-carrying route 7 is provided at the portion opposite to the exit of the conveyor 3a, and the empty bobbin-carrying route 8 is provided at the portion opposite to the entrance of the conveyor 3b, of the winder 1.

As shown in FIG. 1, a bobbin carrier 9 is provided between an outer end side O.E of the fine spinning machine frame 2 and the winder 1 and delivers the full bobbins F and the empty bobbins E respectively between the conveyor 3a and the full bobbin-carrying route 7, and between the conveyor 3b and the empty bobbin-carrying route 8. The bobbin carrier 9 has a belt 10 to carry the peg trays 4. The belt 10 is driven by a motor 13 and is wound around a driving pulley 11 and many guiding pulleys 12 to form substantially three portions of running route; one is the portions adjacent to the ends of both the conveyors 3a and 3b and to the ends of both the full-wound and empty bobbin-carrying routes 7 and 8, where the belt 10 runs horizontally, in the direction crossing both the conveyors 3a and 3b and/or both the full-wound and empty bobbin-carrying routes 7 and 8, at almost the same height as them; another is the portions where the belt 10 runs vertically inside the conveyors 3a and 3b and/or inside the full-wound and empty bobbin-carrying routes 7 and 8; and the other is the portions where the belt 10 runs horizontally, in the longitudinal direction of the fine spinning machine frame 2, above a passage between the winder 1 and the fine spinning machine frame 2.

A pair of linear guiding members 14 are provided running along the belt 10 from the portion corresponding to the end of the conveyor 3a to the portion corresponding to the end of the full bobbin-carrying route 7, putting the pegs 4a of the peg trays 4 therebetween and elastically pressing the trays 4b of the peg trays 4 against the belt 10. A pair of linear guiding members 15 are also provided running along the belt 10 from the portion corresponding to the end of the other conveyor 3b to the portion corresponding to the end of the empty bobbin-carrying route 8, elastically pressing the trays 4b of the peg trays 4 cooperating with the belt 10. Both the guiding members 14 and 15 are provided so as to make the posture of the empty bobbins E and/or the full bobbins F, which are fitted to the peg trays 4 moving with the belt 10, substantially horizontal except at the portions adjacent to the ends of the conveyors 3a and 3b and to the ends of the full-wound and empty bobbin-carrying routes 7 and 8.

Figure 4:
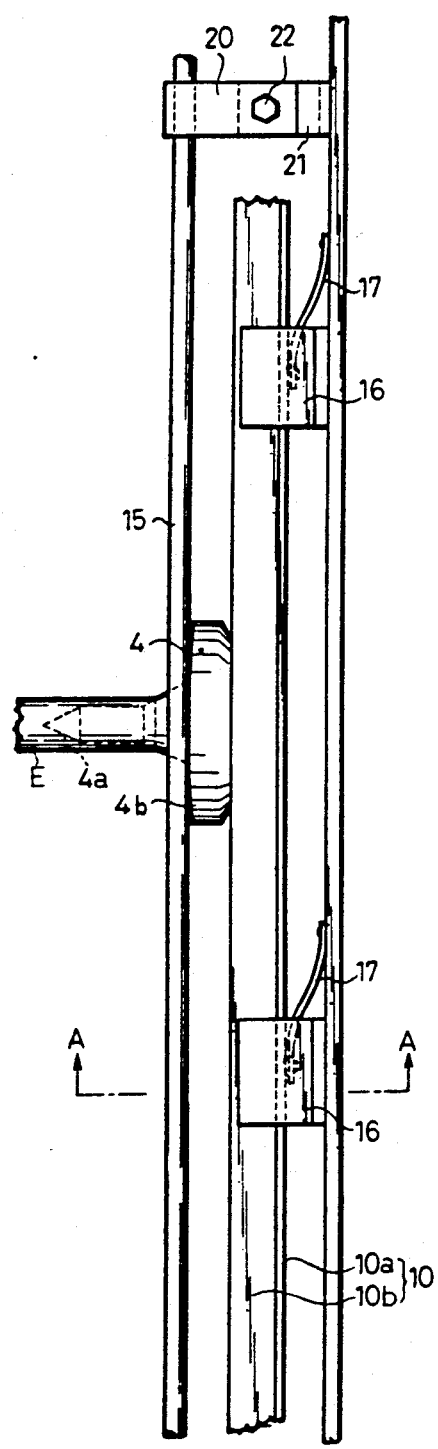
Figure 5A:
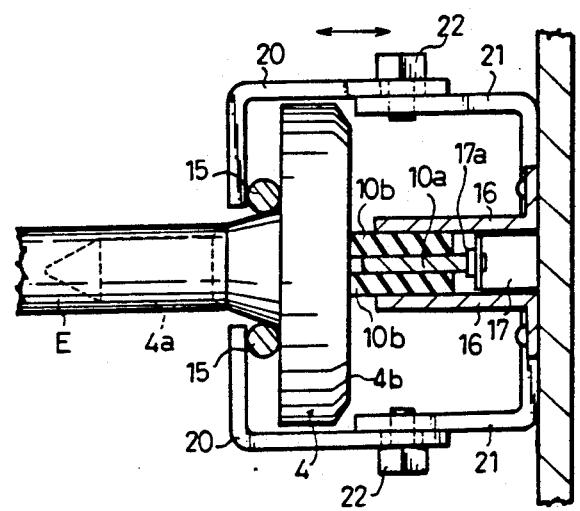
Figure 5B:
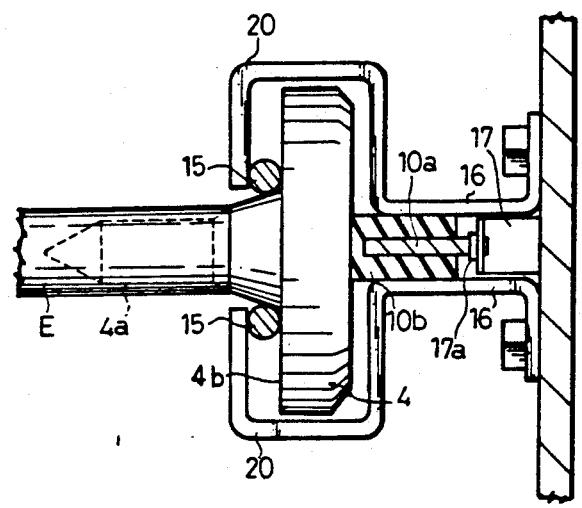

As shown in FIGS. 4 and 5 (a), a flat belt as one form of the belt 10 comprises a sliding core band 10a made of nylon of low friction and a rubber layer 10b of high friction. The sliding core band 10a and the rubber layer 10b are laminated and one end of the sliding core band 10a is protruded from the rubber layer 10b. The peg trays 4 moves with the belt 10 while the bottom surfaces of the peg trays 4 are pressed against the rubber layer 10b of the belt 10. At the portions where the empty bobbins E and the full bobbins F fitted to the peg trays 4 move in the horizontal posture, the peg trays 4 are carried while having cantact with the rubber layer 10b of the belt 10 at the opposite side of the protruding portion of the sliding core band 10a. At the same portions as described above, pairs of guiding segments 16 which guide the belt 10 while putting the belt 10 therebetween are arranged along the belt 10 at the predetermined intervals. Also at the same portions, plate springs 17 which have contact with the sliding core band 10a to elastically press the belt 10 in its width direction, namely, toward the guiding members 14 and 15 are provided at the predetermined intervals. Supporting segments 20 to which the guiding members 14 and 15 are attached and fixed to supporting brackets 21 by means of bolts 22 while the positions of the supporting segments 20 can be adjustable in the direction shown as an arrow in FIG. 5 (a). The plate springs 17 do not have direct contact with the sliding core band 10, but have indirect contact with the sliding core band 10 via contact portions 17a made of antifriction members such as ceramics. Even though the pressing direction of the plate springs 17 is the width direction of the belt 10, the belt 10 will not fall off from the guiding pulleys 12 because the moving amount of the belt 10 by the plate springs 17 is little. As shown in FIG. 5 (b), a guiding segment 16 and a supporting segment 20 can also be formed integrally.

One ends, which correspond to the conveyors 3a and 3b, of the guiding members 14 and 15 are formed respectively extending above the guiding rails 5a of the conveyors 3a and 3b as shown in FIGS. 3 (a) and 3 (b), so that the delivery of the peg trays 4 can be easily done between the conveyors 3a and 3b and the bobbin carrier 9. The other ends, which correspond to the full bobbin-carrying route 7 and to the empty bobbin-carrying route 8, of the guiding members 14 and 15 are also formed respectively extending above the guiding rails (not shown) of the full bobbin-carrying route 7 and of the empty bobbin-carrying route 8.

The operation of the apparatus as described above will be explained hereinafter. After finishing changing bobbins in accordance with the full bobbin stop of the machine frame, the full bobbins F are fitted to the peg trays 4 and it is ready to carry out the full bobbins F and to carry in the empty bobbins E. Then, after the winder 1 emits a full bobbin request signal, the full bobbins F start being carried out from the fine spinning machine frame 2, and also the empty bobbins E start being carried into the machine frame 2.

One conveyor 3a is driven in the direction in which the peg trays 4 are carried toward the outer end O.E, and the other conveyor 3b is driven in the direction in which the peg trays 4 are carried toward the gear end G.E. Accordingly, the peg trays 4 on the conveyor 3b are sent to the conveyor 3a via the connecting rail 6. The peg trays 4 inserted into the full bobbins F are successively transferred onto the belt 10 of the bobbin carrier 9, guided by the guiding members 14. Then, the peg trays 4 are tilted in the same diection as the longitudinal direction of the fine spinning machine frame 2 by means of the guiding members 14 and the posture of the full bobbins F on the peg trays 4 are changed into the horizontal ones. On the way of the portion where the belt 10 runs up vertically beside the fine spinning machine frame 2, the direction of the full bobbins F is changed so as to cross the longitudinal direction of the fine spinning machine frame 2 and the full bobbins F are carried toward the winder 1 while keeping the same changed direction as just described above. On the way of the portion where the belt 10 runs down vertically beside the winder 1, the direction of the full bobbins F is again changed into the same one as the longitudinal direction of the machine frame 2, and the full bobbins F are carried down to the same height as the full bobbin-carrying route 7 while keeping the same changed direction as just described above. Before the full bobbins F come to the portion corresponding to the full bobbin-carrying route 7, the posture of the full bobbins F are again changed vertical by means of the guiding members 14, the peg trays 4 are carried onto the full bobbin-carrying route 7.

On the other hand, the peg trays 4 inserted into the empty bobbins 4 which have been used at the winder 1 are carried from the empty bobbin-carrying route 8 onto the belt 10 of the bobbin carrier 9 while being guided by the guiding members 15. The peg trays 4 carried onto the belt 10 with the empty bobbins E being in the vertical posture are tilted in the longitudinal direction of the fine spinning machine frame 2 to make the posture of the empty bobbins E horizontal and move with the belt 10. On the way of the portion where the belt 10 runs up vertically beside the winder 1, the direction of the empty bobbins E is changed outside to cross the longitudinal direction of the fine spinning machine frame 2, and then the peg trays 4 inserted into the empty bobbins E are carried toward the fine spinning machine frame 2. On the way of the portion where the belt 10 runs down vertically, the posture of the empty bobbin E is again changed into the longitudinal direction of the fine spinning machine frame 2 and the empty bobbins E are carried to the same height as the conveyor 3b. Before the peg trays 4 inserted into the empty bobbins E come to the portion corresponding to the conveyor 3b, the posture of the empty bobbins E is again changed into the vertical direction by means of the guiding members 15, and the peg trays 4 are then carried onto the conveyor 3b.

The peg trays 4 inserted into the empty bobbins E which are carried onto the conveyor 3b via the bobbin carrier 9 are sent onto the conveyor 3a via the connecting rail 6. When the front one of the peg trays 4 inserted into the empty bobbins E comes to the predetermined position at the outer end side O.E of the conveyor 3a, the conveyance of the front peg tray 4 is restricted by means of a stopper not shown. The following peg trays 4 successively come to be positioned at the front portion of the spindle rail while having contact with one another. A counter (not shown) is provided at the gear end side G.E of the conveyor 3b, and a stopper (not shown) at the predetermined position of the gear end side G.E of the conveyor 3b is energized to restrict the conveyance of the peg trays 4 when the number of the empty bobbins E carried onto the conveyor 3a comes to the predetermined number. The peg trays 4 supporting the empty bobbins E are successively positioned corresponding to a spindle row.

A full bobbin sensor (not shown) is provided at the end of the conveyor 3a, and an empty bobbin sensor (not shown) is provided at the end of the empty bobbin-carrying route 8. Both the sensors respectively count the number of the full bobbins F and the empty bobbins E which are carried onto the bobbin carrier 9. When the predetermined time passes after the number of both kinds of the bobbins F and E come to the predetermined number, the drive of the motor 13 stops to finish carrying out the full bobbins F and to finish carrying in the empty bobbins E. The manufacturing cost of the apparatus can be lower because only the one motor is required for the one belt which can carry in and out each the empty and full bobbins E and F, as described above. Moreover, the full bobbins F and the empty bobbins E are carried in the substantially horizontal posture at the portion where the belt 10 runs horizontally near below a ceiling, so that it is not necessary to have a large amount of space between the belt 10 and the ceiling, and that even under a low ceiling the conveyance of the bobbins can be done easily.

The Second Embodiment

Figure 9:
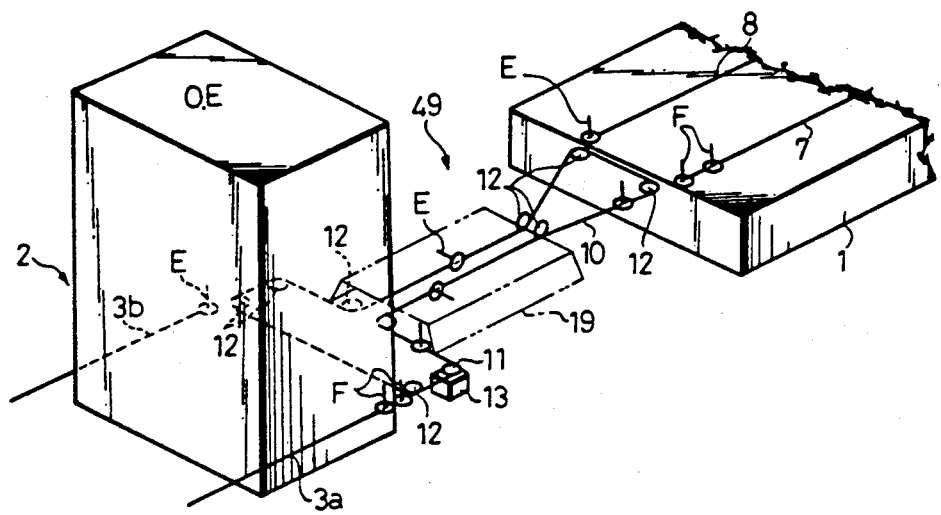
FIGS. 9 and 10 are diagrammatic perspective views respectively showing modified examples of a bobbin-carrying apparatus.
Figure 10:
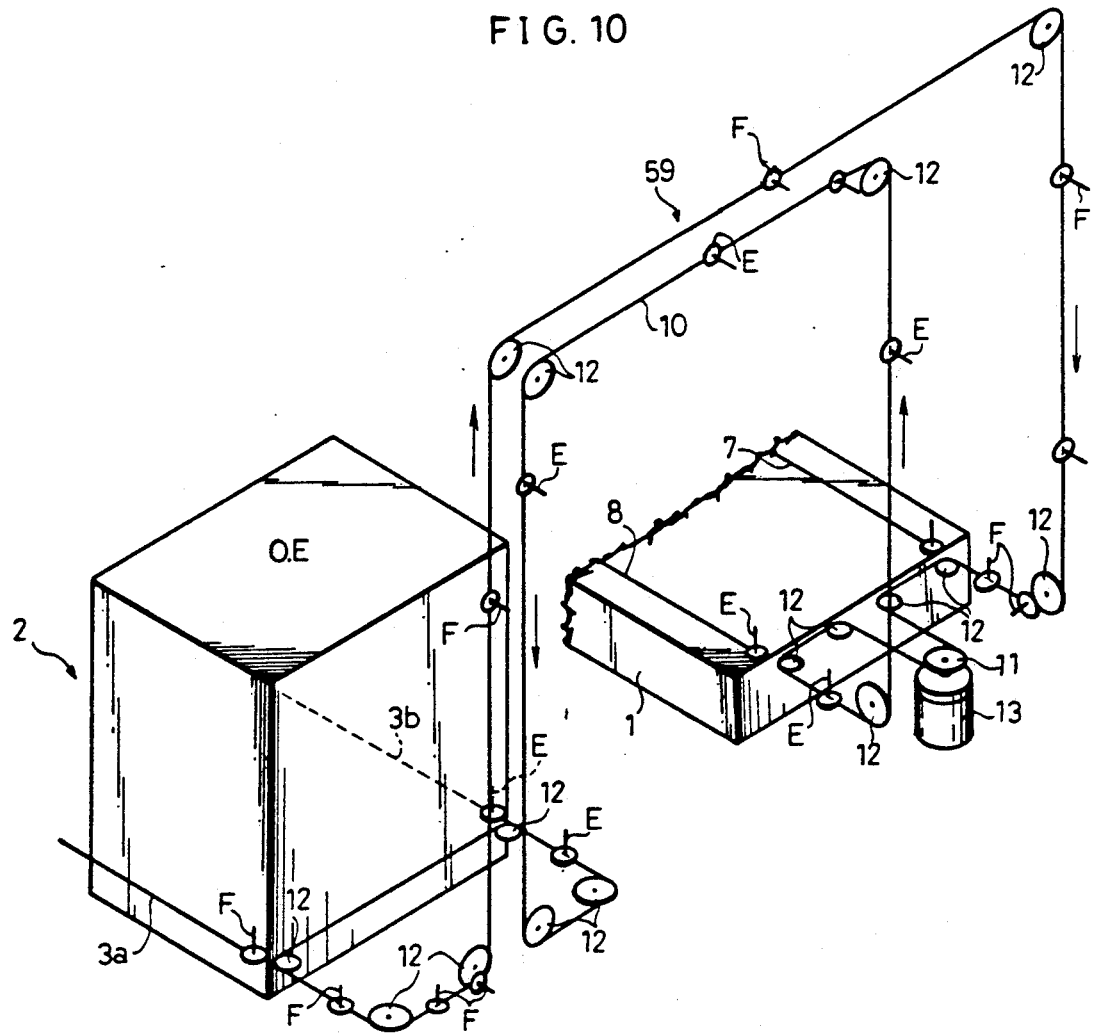

The second embodiment of the present invention will be explained hereinafter referring to FIGS. 6 to 8. There is a big difference between the first and second embodiments that a belt 40 of a bobbin carrier 39 runs inside an underground pit 18 provided at the floor between the winder 1 and the fine spinning machine frame 2 in the apparatus of the second embodiment. As shown in FIG. 6, the belt 40 is hooked around many guiding pulleys 42, and those of the guiding pulleys 42 which are provided adjacent to the fine spinning machine frame 2 and to the winder 1 are arranged to make the supporting shafts thereof vertical. The guiding pulleys 42 which are provided inside the underground pit 18 and/or adjacent to the underground pit 18 beside the fine spinning machine frame 2 are arranged to make the supporting shafts thereof horizontal and to make the interval between two parallel running routes of the belt 40 running inside the underground pit 18 narrower than the interval between the conveyors 3a and 3b and/or the interval between the full bobbin-carrying route 7 and the empty bobbin-carrying route 8. Guiding members 44 and 45 are provided along the belt 40 to make the posture of the empty bobbins E and of the full bobbins F fitted to the peg trays 4 project outward and be substantially horizontal when the peg trays 4 are carried inside the underground pit 18. Accordingly, in the apparatus of the present invention, when the bobbin carrier 39 drives to carry the full bobbins F out of the fine spinning machine frame 2 and to carry the empty bobbins E to the frame 2, the peg trays 4 inserted into the full bobbins F are, while keeping the substantially vertical posture, carried onto the belt 40 of the bobbin carrier 39 and move with the belt 40. On the way of the running route of the belt 40 to the underground pit 18, the posture of the full bobbins F is changed to project substantially horizontally outside of the belt 40, and the peg trays 4 move inside the underground pit 18 toward the winder 1 while keeping the horizontal posture just described above. After getting out of the underground pit 18, the full bobbins F are changed into the vertical posture before coming to the portion correspond to the end of the full bobbin-carrying route 7, and are carried onto the full bobbin-carrying route 7 in the vertical posture. On the other hand, as for the peg trays 4 inserted into the empty bobbins E carried from the empty bobbin-carrying route 8 to the belt 40 of the bobbin carrier 39, the posture of the empty bobbins E is changed to project horizontally outside of the belt 40 on the way to the underground pit 18, and the peg trays 4 move inside the underground pit 18 while keeping the above-described posture. After getting out of the underground pit 18, the empty bobbins E again come to be in the vertical posture and are carried onto the conveyor 3b in the same posture. Accordingly, the depth of the underground pit 18 can be small because the empty bobbins E and the full bobbins F are conveyed in the substantially horizontal posture inside the underground pit 18. Moreover, the guiding pulleys 42 are provided to narrow the interval between the running routes of the belt 40 inside the underground pit 18, so that the width of the underground pit 18 can be small and the installation cost will be lower. The first and second embodiments can be modified as below; for example, a bobbin carrier 49 can be positioned on the floor between the winder 1 and the fine spinning machine frame 2 as shown in FIG. 9. In this case, as well as the second embodiment described above, the belt 10 and the guiding members 14 and 15 are provided in order that the interval of the running routes of the belt 10 between the winder 1 and the fine spinning machine frame 2 running in the longitudinal direction of the frame 2 might be narrow and that the empty bobbins E and/or the full bobbins F might be carried in the substantially horizontal posture. Therefore, both the height and width of a step 19 on which an operator can walk above the bobbin carrier 49 can be small, so that the operator can pass therethrough easily. When the winder 1 and the fine spinning machine frame 2 are positioned in parallel with each other as shown in FIG. 10, a bobbin carrier 59 which is substantially the same as the one in the first embodiment can be used.

The Third Embodiment

The third embodiment of the present invention will be explained hereinafter referring to FIGS. 11 to 14.

Figure 11:
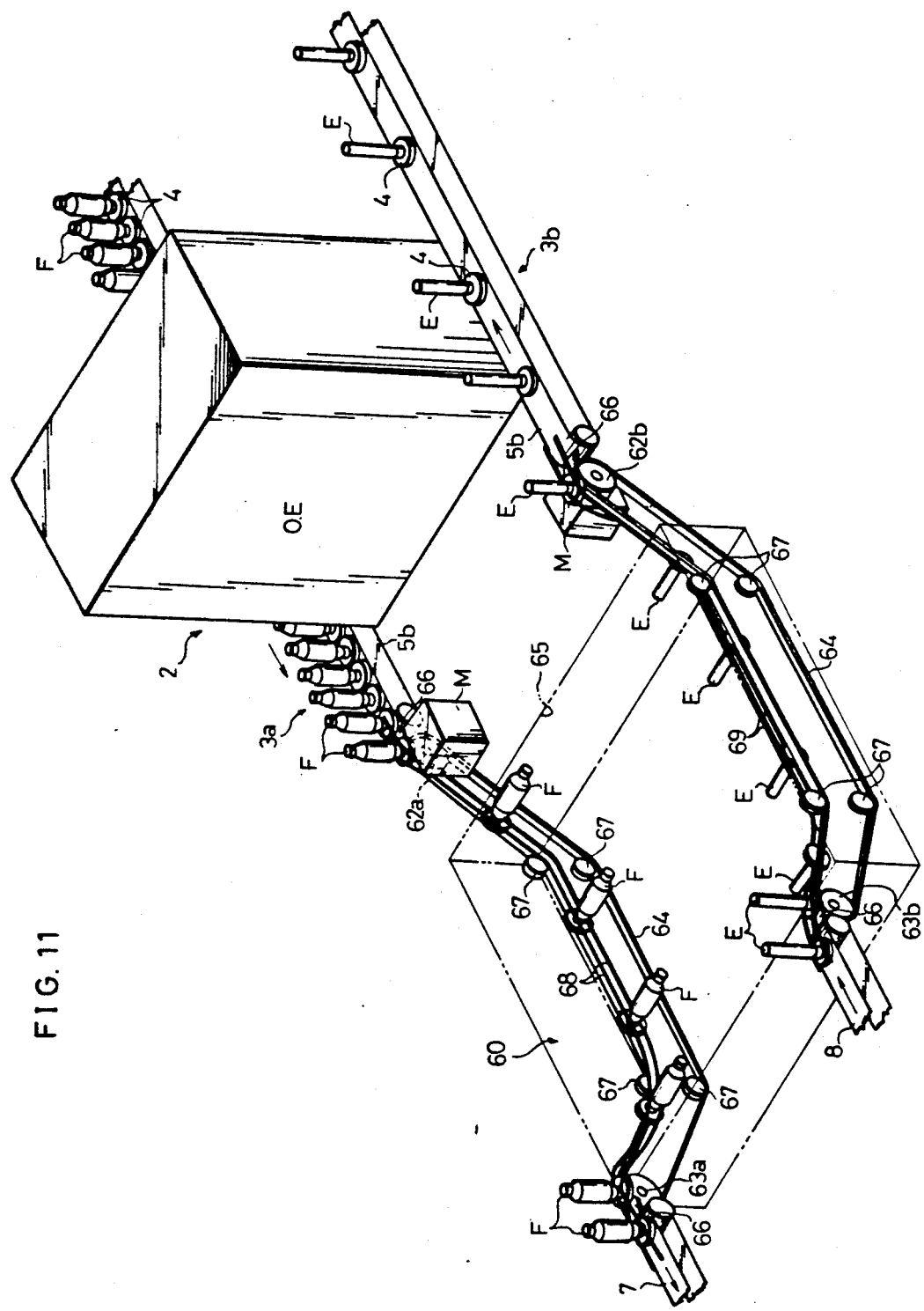
FIGS. 11 to 14 show the third embodiment of the present invention.
Figure 12:
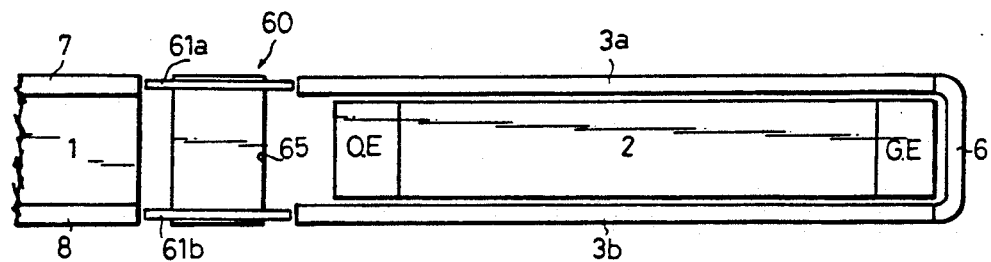

As shown in FIG. 12, a bobbin carrier 60 comprises a pair of carriers 61a and 61b which are respectively provided between the exit side of the conveyor 3a and the entrance side of the full bobbin-carrying route 7 of the winder 1 and between the entrance side of the conveyor 3b and the exit side of the empty bobbin-carrying route 8 of the winder 1, and which extend in the longitudinal direction of the fine spinning machine frame 2. As shown in FIG. 11, both the carriers 61a and 61b are constituted so that endless belts 64 which are hooked around driving pulleys 62a and 62b and around driven pulleys 63a and 63b run inside an underground pit 65 installed at the floor between the winder 1 and the fine spinning machine frame 2.

The driving pulleys 62a and 62b driven by a motor M are provided adjacent to the ends of both the conveyors 3a and 3b, and the driven pulleys 63a and 63b are provided adjacent to the ends of the full bobbin-carrying route 7 and of the empty bobbin-carrying route 8. The upper surfaces of the driving pulley 62a and of the driven pulley 63b are positioned lower than the upper surfaces of the belt conveyor 5b and of the empty bobbin-carrying route 8 respectively. The upper surfaces of the driving pulley 62b and the driven pulley 63a are positioned higher than the upper surfaces of the belt canveyor 5b and of the full bobbin-carrying route 7 respectively. Guiding plates 66 are provided between the upper surfaces of the pulleys 62a, 62b, 63a, 63b and the upper surfaces of the belt conveyor 5b and of the bobbin-carrying routes 7, 8 to make the front sides thereof lower than the other sides in the running direction of the peg trays 4. The plural guiding pulleys 67 which guide the belt 64 to run inside the underground pit 65 are provided inside the underground pit 65 having the axis thereof extend in the horizontal direction.

A pair of linear guiding members 68 are provided along the upper running route of the belt 64 from the portion corresponding to the end of the conveyor 3a to the portion corresponding to the end of the full bobbin-carrying route 7 in order to put the pegs 4a of the peg trays 4 therebetween and in order to press the peg trays 4 cooperating with the belt 64 elastically. A pair of linear guiding members 69 are also provided along the upper running route of the belt 64 from the portion corresponding to the end of the conveyor 3b to the portion corresponding to the end of the empty bobbin-carrying route 8 in order to press the peg trays 4 elastically cooperating with the belt 64. Both the guiding members 68 and 69 are arranged to make the posture of the empty bobbins E and of the full bobbins F tilted inside and be substantially horizontal at any other places except for the places adjacent to the ends of the conveyor 3a and 3b, to the end of the full bobbin-carrying route 7, and to the end of the empty bobbin-carrying route 8. Both the guiding members 68 and 69 are provided not to have contact with the upper surfaces of the peg trays 4 at the portions corresponding to the guiding plates 66 in order that the peg trays 4 might be able to slide down on each guiding plate 66 by their own weights.

Figure 13A:
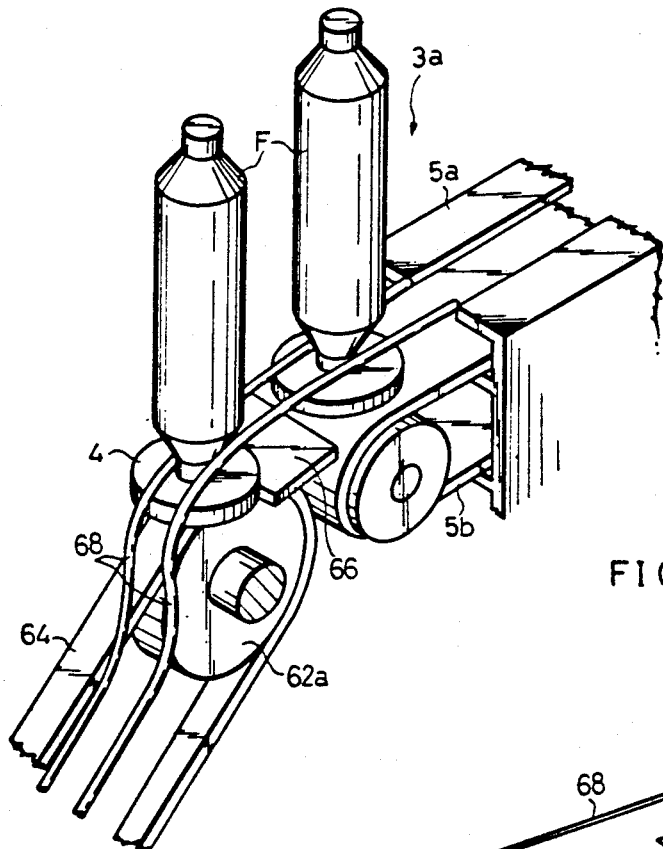
Figure 13B:
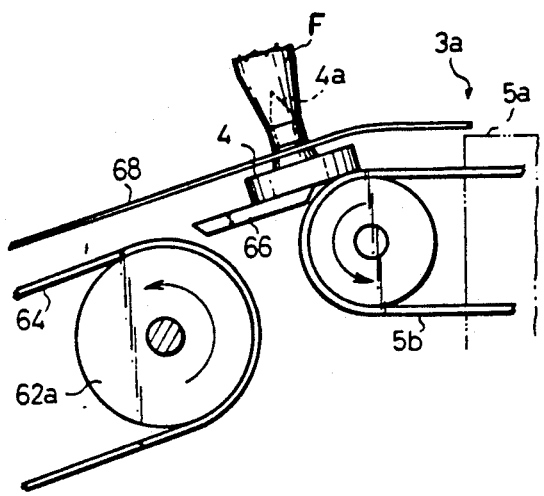
Figure 14:
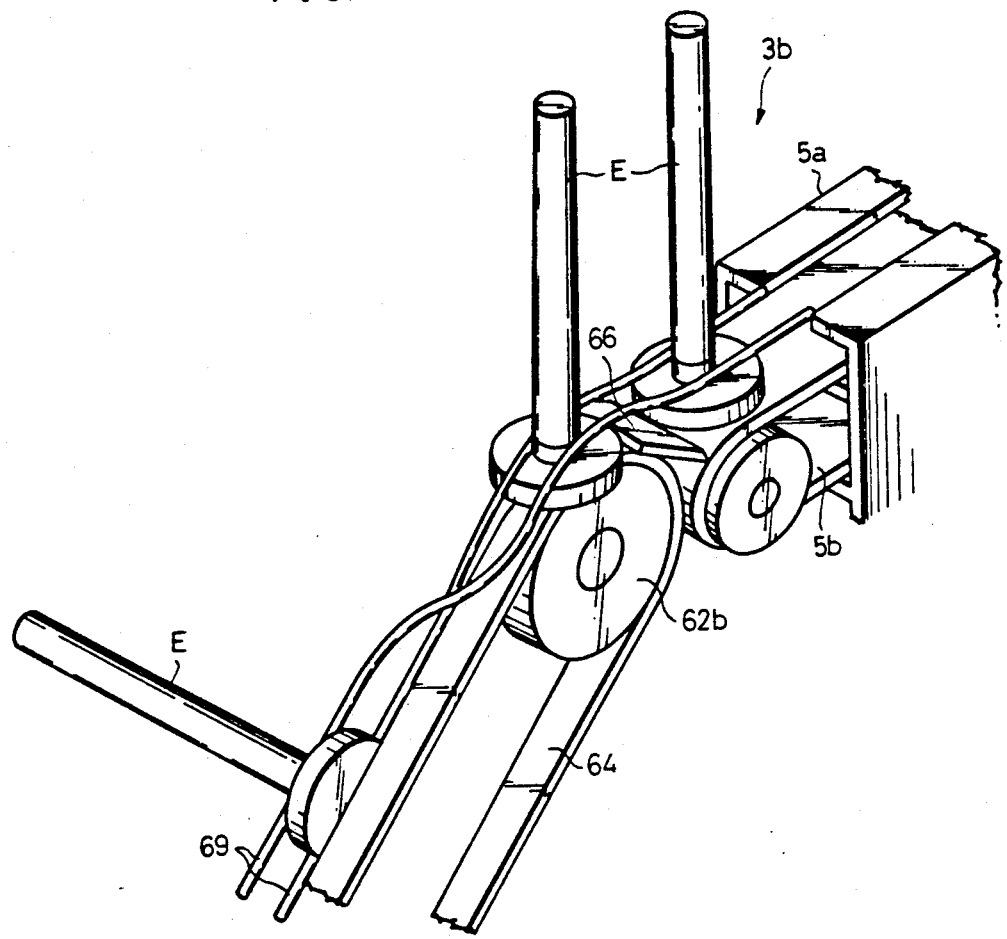

The ends, which correspond to the conveyors 3a and 3b, of the guiding members 68 and 69 are formed to extend above the guiding rails 5a of the conveyors 3a and 3b as shown in FIGS. 13 (a), 13(b) and 14, so that the conveyance of the peg trays 4 between the conveyors 3a, 3b and the bobbin carrier 60 might be able to be done easily. The ends, which correspond to the full bobbin-carrying route 7 and to the empty bobbin-carrying route 8, of the guiding members 68 and 69 are also formed to extend respectively above the guiding rails (not shown) of the full bobbin-carrying route 7 and of the empty bobbin-carrying route 8.

The operation of the apparatus constituted as just described above will be explained hereinafter.

In accordance with the motion of the bobbin carrier 60, the peg trays 4 inserted into the full-wound bobbins F on the conveyor 3a are successively carried onto the belt 64 of the carrier 61a, and then are tilted inside in the horizontal posture by means of the guiding members 68 to be carried toward the winder 1. Before the peg trays 4 come to the portion corresponding to the full-wound bobbin-carrying route 7, the posture of the peg trays 4 is again changed vertically by means of the guiding members 68, and then the peg trays 4 are carried onto the full-wound bobbin-carrying route 7.

On the other hand, the peg trays 4 inserted into the empty bobbins E which have been used at the winder 1 are transferred from the empty bobbin-carrying route 8 to the belt 64 of the carrier 61b guided by the guiding members 69 and the guiding plate 66. The peg trays 4 which are carried onto the belt 64 having the posture of the empty bobbins E vertical are turned to be horizontal projected toward the inside of the underground pit 65 by means of the guiding members 69 and move with the belt 64. Then before coming to the portion corresponding to the conveyor 3b, the empty bobbins E are again turned to be vertical by means of the guiding members 69 and the peg trays 4 inserted into the empty bobbins E are carried onto the conveyor 3b. As described above, after the peg trays 4 are transferred onto the carriers 61a and 61b, the posture of the full-wound bobbins F and of the empty bobbins E is changed horizontal being projected toward the inside of both the carriers 61a and 61b and are carried in the horizontal posture, so that a large amount of space is not necessary above the belt 64 for the conveyance of the bobbins. Accordingly, the depth of the underground pit 65 can be small, and the width of the pit 65 is not required to be large. In the apparatus of the present embodiment, the guiding plates 66 are provided, between the driving pulleys 62a, 62b, the driven pulleys 63a, 63b and the conveyors 3a, 3b, the bobbin-carrying routes 7, 8, while having the front portion thereof lower in the running direction of the peg trays 4, so that the conveyance of the peg trays 4 can be done easily even if the diameter of the pulleys 62a, 62b, 63a, and 63b is larger than the diameter of the peg trays 4.

Figure 15:
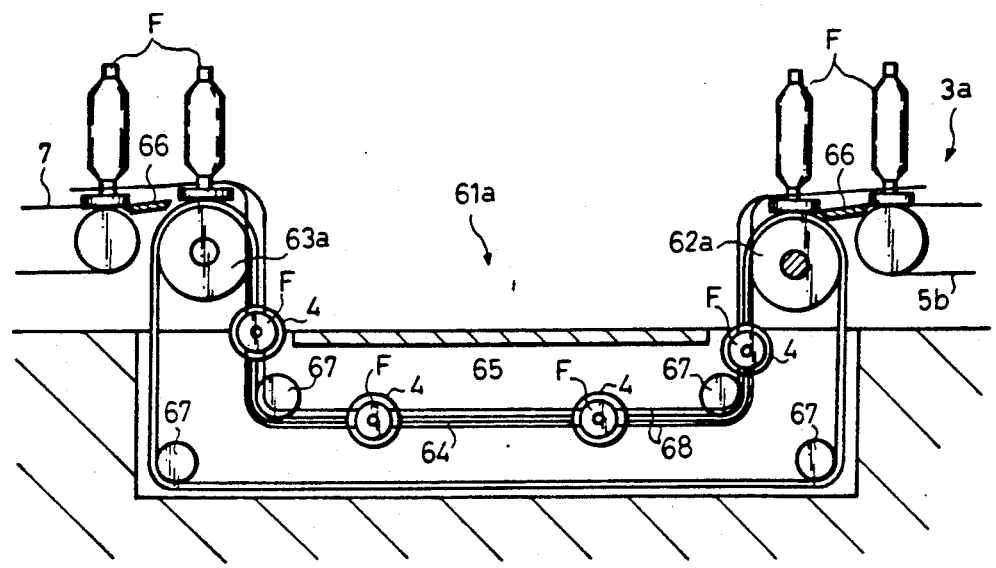
FIG. 15 is a side view of a modified example of a bobbin-carrying apparatus.
Figure 16:
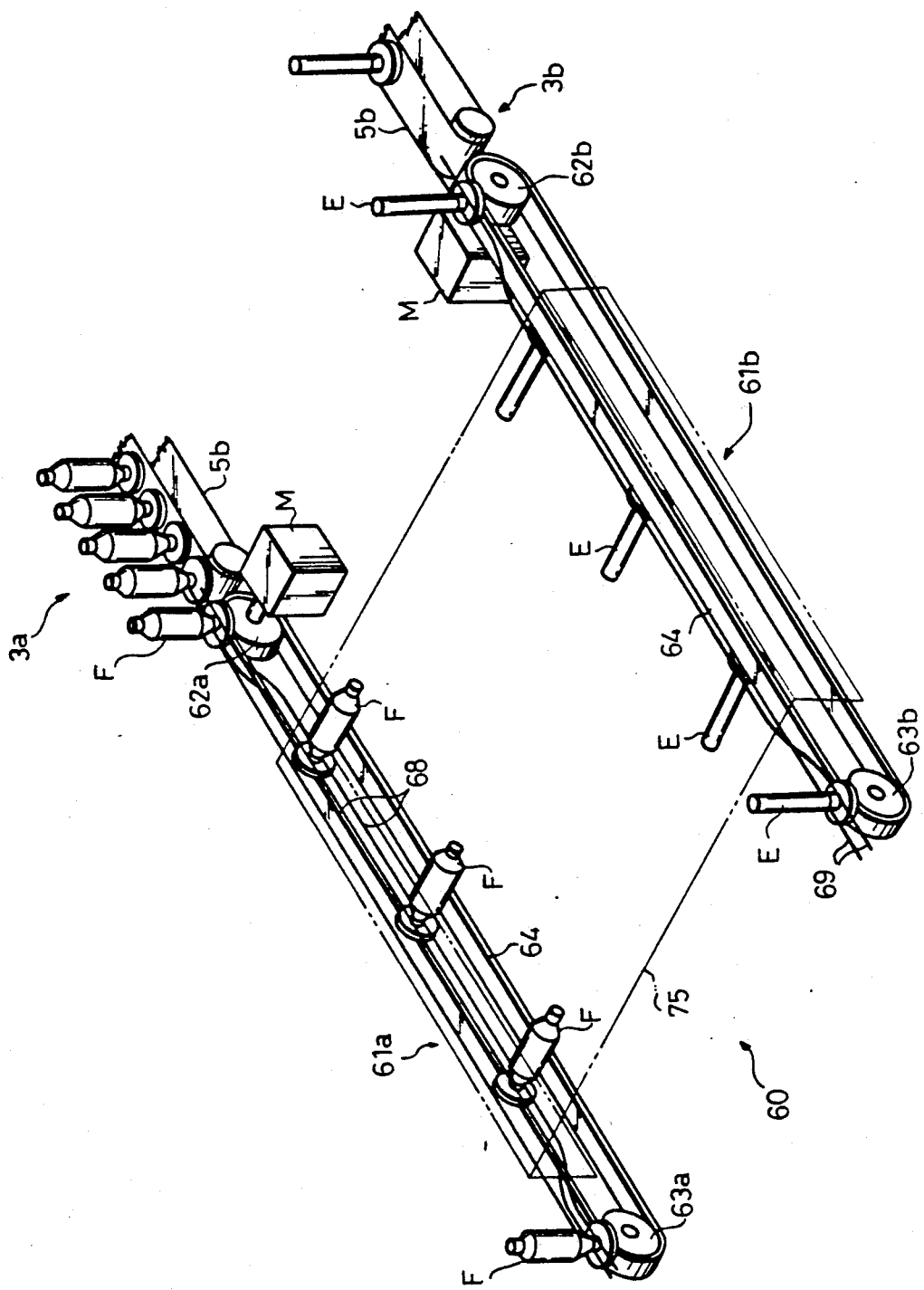
FIG. 16 is a diagrammatic perspective view of another modified example of a bobbin-carrying apparatus.
Figure 19:
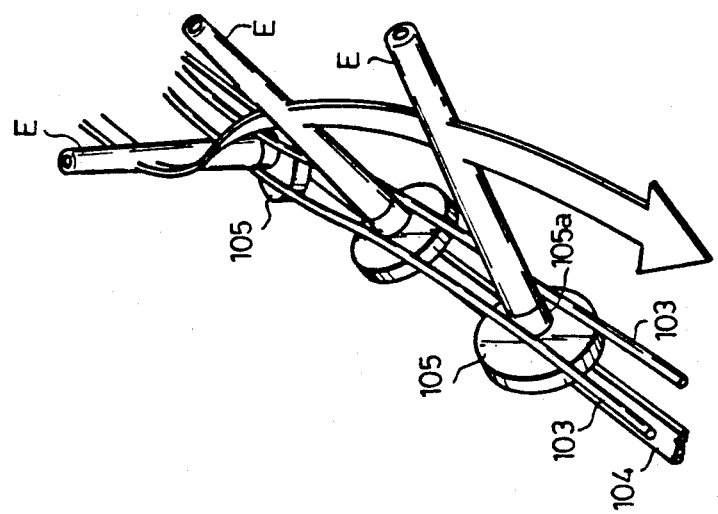
FIG. 19 is a partial perspective view of a bobbin-carrying apparatus of the related art.
Figure 18:
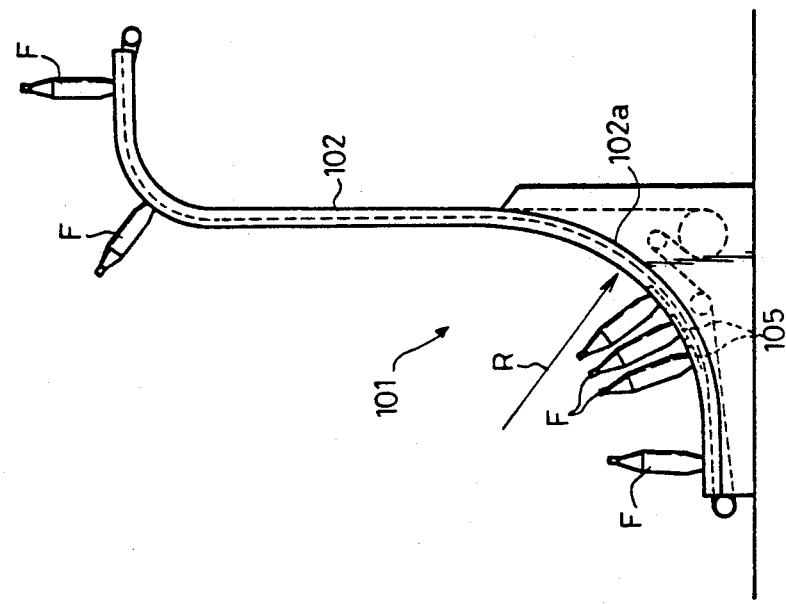
FIG. 18 is a side view of a vertical conveyor of the related art.
Figure 17:
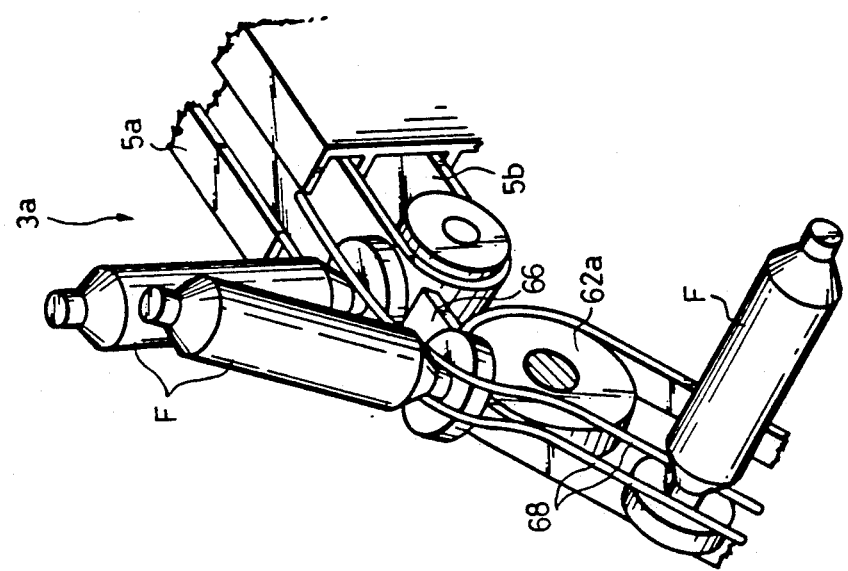
FIG. 17 is a partial perspective view of a bobbin transferring portion.

The present embodiment can be modified as described below; for instance, the carriers 61a and 61b can be constituted in the way shown in FIG. 15 so that the running route of the belt 64 before coming to the portion where the belt 64 runs horizontally in the underground pit 65 might be substantially vertical. The extra space for the bobbin conveyance has to be prepared before the underground pit 65 when the running route of the belt 64 is made to be tilted to the portion where the belt 64 runs horizontally like the aforementioned third embodiment, but if the apparatus is constituted like the modified example as described above, the space before the underground pit 65 can be very small. Moreover, as shown in FIG. 16, instead of installing the underground pit 65, the carriers 61a and 61b can be positioned on the floor. In this case, the empty bobbins E and the full-wound bobbins F are also carried in the horizontal posture projected inside facing each other, so that the height of a step 75 on which an operator can pass through above the bobbin carrier 60 might be small. The guiding plates 66, which are positioned at the connecting portions between the conveyor 3a and the carrier 61a and between the empty bobbin-carrying route 8 and the carrier 61b, can also be provided to be tilted lower inside as shown in FIG. 17. In this case, when the peg trays 4 move from the conveyor 3a and/or the empty bobbin-carrying route 8 onto the belt 64 of the carriers 61a and 61b sliding on the guiding plates 66, peg trays 4 are carried to make the full-wound bobbins F and the empty bobbins E tilted lower inside on the guiding plates 66 and the posture of the bobbins can be easily changed. Moreover, the guiding plates 66 can be omitted by having the upper surface of the driving and driven pulleys 62a, 62b, 63a, and 63b and those of the full-wound and empty bobbin-carrying routes 7 and 8 at the same height and by making the diameters of the pulleys smaller.

As many apparently widely different embodiments of this invention may be made without departing from the spirit and scope thereof, it is to be understood that the invention is not limited to the specific embodiments thereof except as defined in the appended claims.

What is claimed is:

1. A bobbin-carrying apparatus of a combined fine spinning machine and winder for carrying peg trays between conveyors provided on the fine spinning machine and bobbin-carrying routes provided on the winder, said peg trays each having a tray and a peg which is mounted and projected on one surface of said tray to support bobbins comprising;

belt means provided between said conveyors and said bobbin-carrying routes, said belt means including a horizontal path, guiding means for guiding and supporting said belt means, driving means for driving said belt means while being operatively connected with said belt means, and a pair of linear guiding members provided extending along said belt means and sandwiching said pegs of said peg trays therebetween, said belt means carrying said peg trays while elastically pressing said trays cooperating with said guiding members, said guiding members provided relative to said belt means so that said peg trays are carried between said fine spinning machine and said winder along said horizontal path while said pegs are arranged horizontally.

2. A bobbin-carrying apparatus according to claim 1 wherein said fine spinning machine and said winder have length and width respectively, a pair of said conveyors are provided on opposing sides of said fine spinning machine in the width direction thereof, a pair of said bobbin-carrying routes are provided on sides of said winder in the width direction thereof, and said belt means is an endless belt which connects one of said pair of conveyors and one of said pair of bobbin-carrying routes and connects the other of said pair of bobbin-carrying routes.

3. A bobbin-carrying apparatus according to claim 2 wherein said fine spinning machine and said winder are provided in a line along the longitudinal direction thereof, said belt includes a pair of first portions which extend up vertically from ends of said pair of conveyors, a pair of second portions which extend horizontally toward said winder being continuous from said first portions, and a pair of third portions which extend down vertically to ends of said bobbin-carrying routes being continuous from said second portions, and said guiding members are provided relative to said belt to guide said pegs of said peg trays from a vertical posture into a first posture, in which said pegs extend in the longitudinal direction of said fine spinning machine, between the ends of said conveyors and said first portions, that said pegs of said peg trays are being arranged from said first posture into a second posture, in which said pegs extend in the width direction of said fine spinning machine, between said first portions and said third portions, and that said pegs of said peg trays are being arranged from said second posture into said first posture between said third portions and the ends of said bobbin-carrying routes.

4. A bobbin-carrying apparatus according to claim 3 wherein said belt further includes a pair of fourth portions extending from the ends of said conveyors to the ends of said first portions in the width direction of said fine spinning machine, and a pair of fifth portions extending from said third portions toward said bobbin-carrying routes in the width direction of said fine spinning machine, said pegs of said peg trays being arranged from the vertical posture into said first posture between the ends of said conveyors and said fourth portions, and said pairs of said peg trays are being arranged from said first posture into the vertical posture between the fifth portions and the ends of said bobbin-carrying routes.

5. A bobbin-carrying apparatus according to claim 2 wherein said fine spinning machine and said winder are provided on a line in the carrying direction of said peg trays, housing means for said bobbin-carrying apparatus are provided between said fine spinning machine and said winder, said belt includes a pair of first portions extending from the ends of said both conveyors toward said housing means while closing each other, a pair of second portions continuous from said first portions extending inside said housing means in the longitudinal direction of said fine spinning machine and in parallel with each other, and third portions continuous from said second portions extending toward the ends of said bobbin-carrying routes while separating each other, said guiding members are provided relative to said belt so that said pegs of said peg trays are being arranged from the vertical posture into said first posture, in which said pegs extend apart from each other in the width direction of said fine spinning machine between the ends of said conveyors and on a way of said first portions, and that said pegs of said peg trays are being arranged from said first posture into the vertical posture between on a way of said third portion and the ends of said bobbin-carrying routes.

6. A bobbin-carrying apparatus according to claim 2 wherein said fine spinning machine and said winder are provided in parallel in the width direction thereof, said belt includes a pair of first portions extending up vertically from the ends of said both conveyors, a pair of second portions continuous from said first portions extending horizontally toward said winder, and a pair of third portions continuous from said second portions extending down vertically to the ends of said bobbin-carrying routes, and said guiding members are provided to said belt so that said pegs of said peg trays are being arranged from the vertical posture into a first posture, in which said pegs extend in the longitudinal direction of said fine spinning machine, between the ends of said conveyors and on a way of said first portions, that said pegs of said peg trays are being arranged from said first posture into the vertical posture between on a way of said third portions and the ends of said bobbin-carrying routes.

7. A bobbin-carrying apparatus according to claim 1 wherein said fine spinning machine and said winder have lengths and widths respectively, said conveyors are provided at both sides of said fine spinning machine in the width direction thereof, said bobbin-carrying routes are provided at both sides of said winder in the width direction thereof, a pair of said bobbin-carrying apparatus are provided between one of said both conveyors and one of said both bobbin-carrying routes and between the other of said both conveyors and the other of said both bobbin-carrying routes, and said belt means of said each bobbin-carrying apparatus is an endless belt.

8. A bobbin-carrying apparatus according to claim 7 wherein said both bobbin-carrying apparatus are provided in parallel so that said belts run substantially in parallel, said guiding members are provided relative to said belts so that said pegs of said peg trays are being arranged from the vertical posture into a first posture, in which said pegs extend in the width direction of said fine spinning machine facing each other, and that said pegs of said peg trays are being arranged from said first posture into the vertical posture between on a way of said belts and the ends of said bobbin-carrying routes.

9. A bobbin-carrying apparatus according to claim 8 wherein guiding plates each having a surface tilted down in the running direction of said peg trays to guide said peg trays are provided between the ends of said conveyors and one end of said belts and between the ends of said bobbin-carrying routes and the other end of said belts.

10. A bobbin-carrying apparatus according to claim 9 wherein
   said guiding members extend above the ends of said conveyors and above the ends of said bobbin-carrying routes,
   an interval which is larger than the thickness of said tray of said peg tray is provided between said surface of said each guiding plate and said guiding member at a portion corresponding to said guiding plate.

11. A bobbin-carrying apparatus according to claim 9 wherein said surfaces of said guiding plates are tilted down in the running direction of said peg trays and are also tilted down in a direction in which said peg trays change from the vertical posture into said first posture.

12. A bobbin-carrying apparatus according to claim 8 wherein
   an underground pit is provided between said fine spinning machine and said winder,
   said belts respectively include a first portion extending down vertically from the ends of said conveyors, a second portion continuous from said first portion to extend horizontally toward said winder, and a third portion continuous from said second portion to extend up vertically to the ends of said bobbin-carrying routes, and
   said guiding members are provided relative to said belts so that said pegs of said peg trays are being arranged from the vertical posture into a first posture, in which said pegs extend in the width direction of said fine spinning machine, between the ends of said conveyors and on a way of said first portion, and that said pegs of said peg trays are being arranged from said first posture into the vertical posture between on a way of said second portion and the ends of said bobbin-carrying routes.

13. A bobbin-carrying apparatus according to claim 8 wherein
   said belt of each carrying apparatus includes a portion extending horizontally from the ends of said conveyors toward said winder, and
   said guiding members are provided relative to said belts so that said pegs of said peg trays are being arranged from the vertical posture into a first posture, in which said pegs extend in the width direction of said fine spinning machine, between the ends of said conveyors and on a way of said portion, and that said pegs are being arranged from said first posture into the vertical posture between on the way of said portion and the ends of said bobbin-carrying routes.

* * * * *